(12) United States Patent
Fakhrizadeh et al.

(10) Patent No.: US 9,346,626 B1
(45) Date of Patent: May 24, 2016

(54) SCREW CONVEYOR

(71) Applicants: Mohammad Fakhrizadeh, Saveh (IR); Zoheir Saboohi, Tehran (IR); Reza Fakhrizadeh, Saveh (IR)

(72) Inventors: Mohammad Fakhrizadeh, Saveh (IR); Zoheir Saboohi, Tehran (IR); Reza Fakhrizadeh, Saveh (IR)

( * ) Notice: Subject to any disclaimer, the term of this patent is extended or adjusted under 35 U.S.C. 154(b) by 0 days.

(21) Appl. No.: 14/963,498

(22) Filed: Dec. 9, 2015

(51) Int. Cl.
*B65G 45/00* (2006.01)
*B65G 33/08* (2006.01)
*B65G 33/26* (2006.01)
*B65G 45/22* (2006.01)

(52) U.S. Cl.
CPC .............. *B65G 45/005* (2013.01); *B65G 33/08* (2013.01); *B65G 33/265* (2013.01); *B65G 45/22* (2013.01)

(58) Field of Classification Search
CPC .............................. B65G 45/005; B65G 45/22
See application file for complete search history.

(56) References Cited

U.S. PATENT DOCUMENTS

| | | | | |
|---|---|---|---|---|
| 3,593,844 A | * | 7/1971 | Barclay | B65G 33/00 198/657 |
| 5,191,966 A | * | 3/1993 | Miller | B65G 53/48 198/493 |
| 5,316,429 A | * | 5/1994 | Connelly | B65G 11/088 414/298 |
| 5,564,555 A | * | 10/1996 | Doi | B65G 45/005 198/495 |
| 5,573,660 A | * | 11/1996 | Eicker | E03F 5/14 100/117 |
| 6,089,334 A | * | 7/2000 | Watts | E21B 10/003 175/170 |
| 7,314,131 B2 | * | 1/2008 | Olds | B65G 33/20 198/658 |
| 8,272,500 B2 | * | 9/2012 | Nishikawa | B65G 35/066 198/465.1 |
| 2011/0121114 A1 | * | 5/2011 | Neier | A01K 5/004 241/101.8 |

* cited by examiner

*Primary Examiner* — Thomas Randazzo
(74) *Attorney, Agent, or Firm* — Falati Law Firm

(57) ABSTRACT

Disclosed is an improved screw conveyor that reduces maintenance. The screw conveyor comprises an elongate trough assembly comprising material input and output gates formed thereon and an elongate screw fighting rotably disposed within the trough assembly. The fighting comprises an elongate hollow shaft comprising a plurality of thorough fluid holes disposed thereon, a proximal end of the shaft adapted to receive a fluid therethrough whereby, the received fluid is discharged from the plurality of fluid holes, and a pair of parallel blades helically wound around the shaft, the blades arranged such that, the fluid holes are disposed between the blades. The fluid is discharged from between the blades forms a pressurized shield between the outer edges of blades and the inner surface of the trough assembly so as to prevent the material from entering the space between the edges of the blades and the inner surface of the trough assembly.

20 Claims, 6 Drawing Sheets

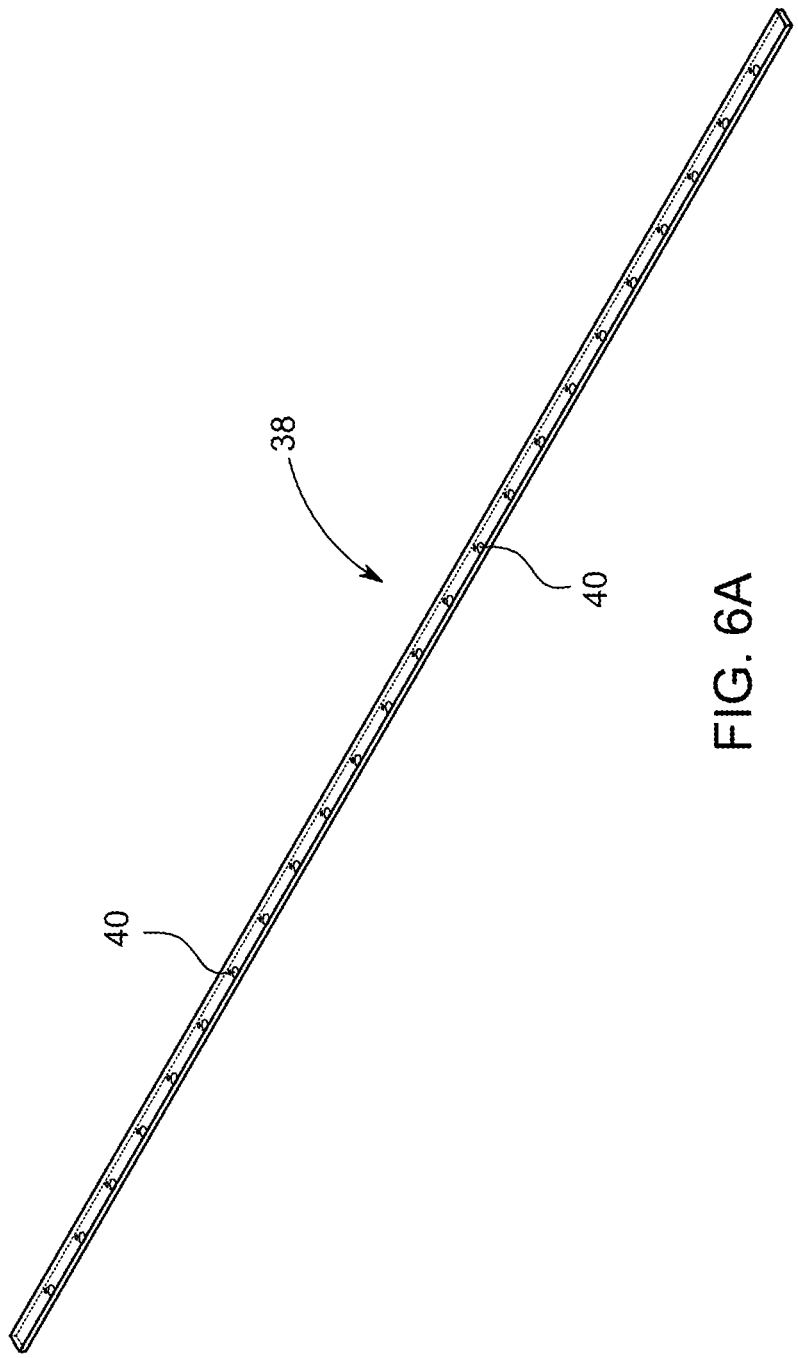

SCREW CONVEYOR

BACKGROUND

The present invention relates to screw conveyors. A screw conveyor is known to be widely used in various industries, such as construction, chemicals, electric power, food, metallurgy, coal, medical, grain and other industries, for horizontal or inclined conveyance of food, medical raw materials, dust, granular materials and small block, such as coal, ash, slag, cement, food, etc.

A screw conveyor basically comprises a screw fighting rotably disposed within a trough. The trough comprises an input and output gates for receiving and discharging material therethrough respectively. Often times, it is observed that, during the conveyance of the material between the input and the output gates, the material, over time, gets deposited within the space between the blades of the fighting and the inner surface of the trough resulting in a clog. As a result of this, the screw conveyor needs to be periodically disassembled and cleaned up. There is a need in the art for an improved screw conveyor that prevents such clogs and thereby reduces the maintenance costs associated therewith.

SUMMARY

The present invention comprises an improved screw conveyor designed for reduced maintenance. The screw conveyor comprises an elongate sealed trough and an elongate screw fighting rotably disposed within the trough assembly so as to be axially rotatable in clock and counter-clock directions as powered by a drive. The fighting comprises an elongate shaft and a pair of parallel blades helically wound around the shaft. The shaft is notably hollow for receiving a fluid, preferably air, therewithin through one of the extremities thereof. The shaft further comprises a plurality of thorough fluid holes disposed thereon in a helical pattern such that, the fluid holes are positioned between the pair of blades. The fighting further comprises an elongate nozzle member shaped helically to be fitted between the outer edges of the pair of blades air-tightly. The nozzle member comprises a plurality of linearly-aligned nozzles disposed thereon.

The fluid entering the shaft discharges initially through the fluid holes. The fluid trapped between the blades and the nozzle member is discharged from the nozzles at a high pressure creating a pressurized fluid shield between the outer edges of the blade and the inner surface of the trough assembly. For a screw conveyor in operation, the fluid shield prevents the material from entering and from eventually getting clogged between the blades and the inner surface of the trough assembly thus reducing the maintenance costs. Additionally, the fluid may be used for heating, cooling, drying and/or humidifying the material that is being conveyed.

One aspect of the present disclosure is directed to a screw conveyor comprising: an elongate trough assembly comprising material input and output gates formed thereon; and an elongate screw fighting rotably disposed within the trough assembly, the fighting comprising: an elongate hollow shaft comprising a plurality of thorough fluid holes helically disposed thereon, a proximal end of the shaft adapted to receive a fluid therethrough whereby, the received fluid is discharged firstly the plurality of fluid holes; and a plurality of parallel blades helically wound around the shaft, the blades arranged such that, the fluid holes are disposed between the blades resulting in the fluid being discharged from between the blades; the discharged fluid forming a pressurized fluid shield between the outer edges of blades and the inner surface of the trough assembly so as to prevent the material from entering the space between the edges of the blades and the inner surface of the trough assembly.

In one embodiment of the screw conveyor, the trough assembly comprises: an elongate trough; and an elongate lid secured over the trough; the flighting disposed between the trough and the lid. In one embodiment of the screw conveyor, the trough comprises a U-trough. In one embodiment, the trough comprises a tubular trough.

In one embodiment, the screw conveyor further comprises a drive rotably coupled to a distal extremity of the shaft, the drive for powering the rotation of the fighting; the drive supported by the trough assembly. In one embodiment, the shaft comprises a plurality of elongate hollow shafts coupled to one another at the extremities thereof. In one embodiment, the screw conveyor further comprises a fluid regulator for regulating the influx of the fluid through the proximal extremity of the shaft. In one embodiment, the fluid comprises gas or a combination of gases. In another embodiment, the gas comprises air.

In one embodiment, the fluid is for having at least one of heating, cooling, drying, humidifying effects on the material being conveyed from the input to the output gates. In another embodiment, the plurality of blades comprises a pair of blades, the surfaces of which are parallel to one another. In one embodiment of the screw conveyor, the fighting further comprising an elongate nozzle member helically secured between two parallel blades, the nozzle member comprising a plurality of nozzles disposed thereon, the nozzles for discharging pressurized fluid therethrough resulting in the formation of the shield. In one embodiment, the nozzle member is disposed between the outer edges of the parallel blades. In another embodiment, the nozzle member is removably secured between the blades.

Another aspect of the present disclosure is a screw conveyor comprising: an elongate trough assembly comprising material input and output gates formed thereon; and an elongate screw flighting rotably disposed within the trough assembly, the fighting comprising: an elongate hollow shaft comprising a plurality of thorough fluid holes helically disposed thereon, a proximal end of the shaft adapted to receive a fluid therethrough whereby, the received fluid is discharged from the plurality of fluid holes; a plurality of parallel blades helically wound around the shaft, the blades arranged such that, the fluid holes are disposed between the blades resulting in the fluid being discharged from between the blades; and an elongate nozzle member helically secured between two parallel blades, the nozzle member comprising a plurality of nozzles disposed thereon, the nozzles for discharging the fluid therethrough; wherein, the pressurized fluid is discharged from the nozzles forms a pressurized fluid shield between the outer edges of blades and the inner surface of the trough assembly so as to prevent the material from entering the space between the edges of the blades and the inner surface of the trough assembly.

In one embodiment, the trough assembly comprises: an elongate trough; and an elongate lid secured over the trough; the fighting disposed between the trough and the lid. In another embodiment, the screw conveyor further comprises a drive rotably coupled to a distal extremity of the shaft, the drive for powering the rotation of the flighting; the drive supported by the trough assembly. In one embodiment, the screw conveyor further comprises a fluid regulator for regulating the influx of the fluid through the proximal extremity of the shaft. The fluid, in one example, comprises a gas or a combination of gases. In another embodiment, the plurality of blades comprises a pair of blades, the surfaces of which are parallel to one another.

Other objects and advantages of the embodiments herein will become readily apparent from the following detailed description taken in conjunction with the accompanying drawings.

BRIEF DESCRIPTION OF THE DRAWINGS

FIGS. 6A and 6B are perspective views nozzle members.

FIGURES

Reference Numerals

10—Screw Conveyor
12—Screw Flighting
14—Lid
16—U-trough
18—Flange
20—Bottom Leg
22—Handle
24—Hollow Shaft
26—Blade
28P—Proximal Extremity of the Shaft
28D—Distal Extremity of the Shaft
30—Bearing Seat
32—Fluid Hole
34—Pin Hole
36—Pin
38—Nozzle Member
40—Nozzle
42—Hanger
44—Hanger Base
46—Hanger Arm
48—Bearing Cap
50—Bearing
52—Drive
54—Fluid Regulator

DETAILED DESCRIPTION

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The existing screw, belt, and pneumatic conveying systems which are widely used in handling small size particles such as detergents, foodstuff, medical raw materials, etc. each have their own important drawbacks. For example, it is almost impossible for a belt conveyor to be used in a strictly closed environment. Both belt and screw conveyors are limited in the angle that they can be used. Pneumatic and screw conveyors would cause an undesired separation of pre-mixed materials such as detergents and cereals. Although dense phase pneumatic conveyors address this undesired separation, it has a high initial cost and the potential to clog causing material waste. In the screw conveying, the material can build up between the casing and flight which results in high cost and heavy maintenance. Therefore, there was a need for designing a system to address these issues.

The present invention relates to screw conveyors and more particularly to an improved screw conveyor that, among other things, prevents material clogging between the flighting and the trough and thereby reduces the maintenance costs thereof.

Figure 1:
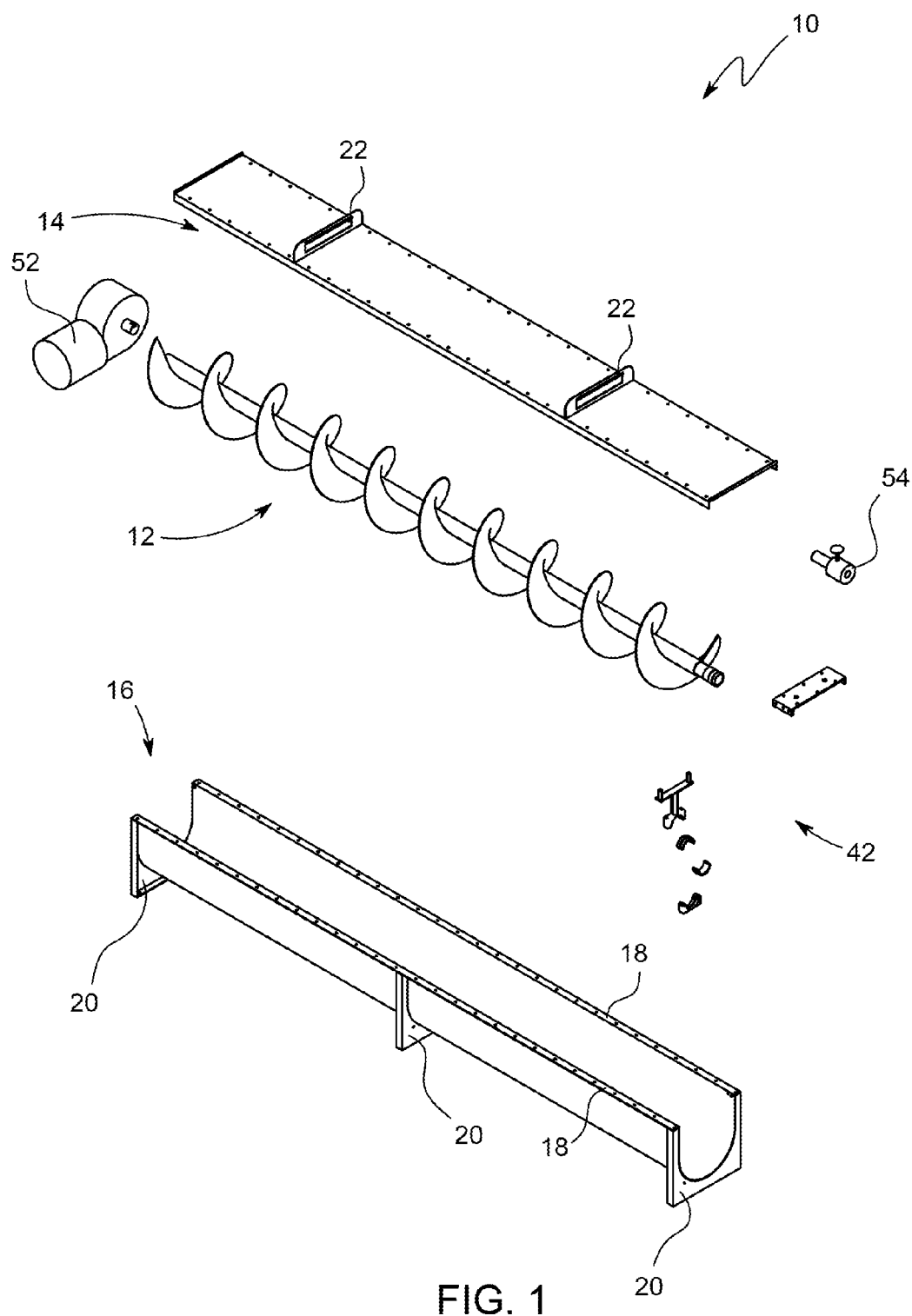
FIG. 1, according to an embodiment of the present invention, is an exploded perspective view of the screw conveyor.
Figure 2:
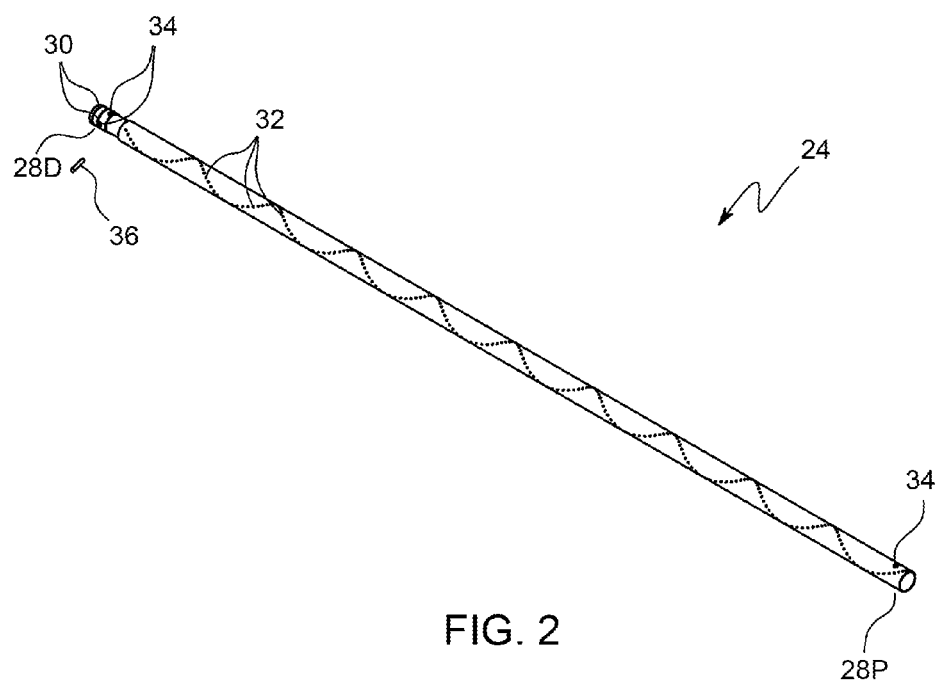
FIG. 2, according to an embodiment of the present invention, is a perspective view of the shaft.
Figure 3:
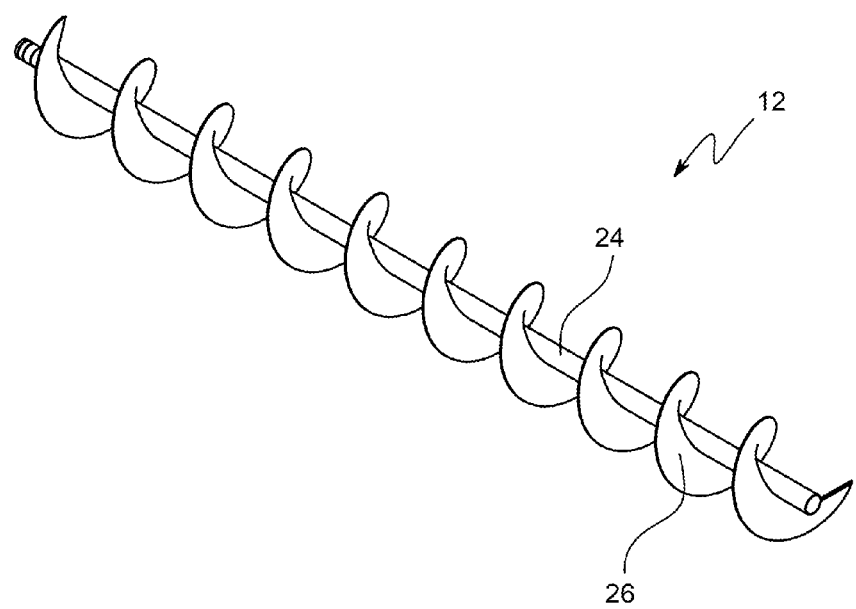
FIG. 3, according to an embodiment of the present invention, is a perspective view of the flighting.
Figure 4:
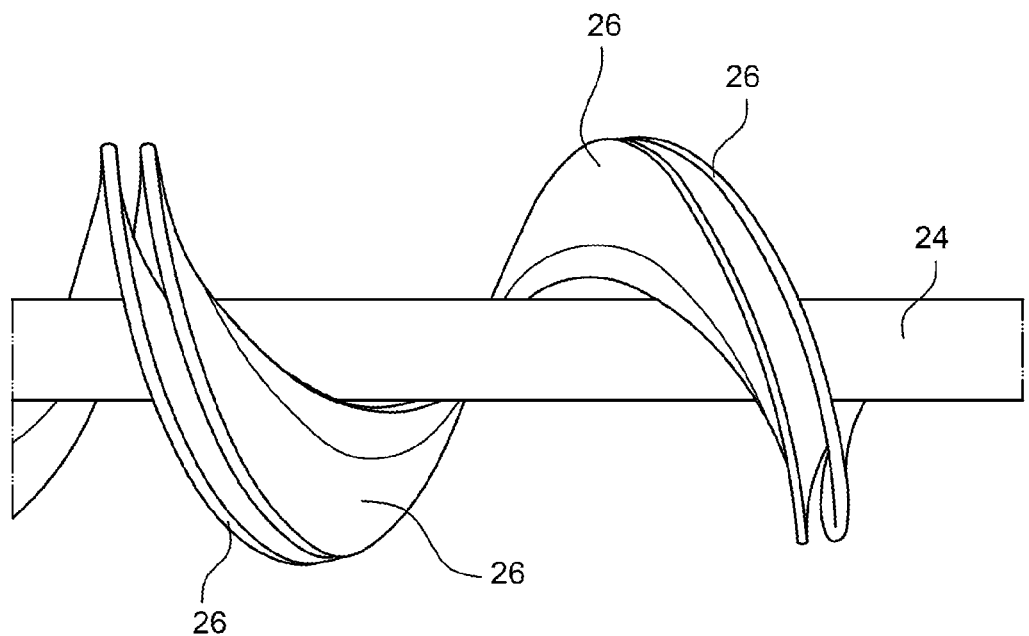
FIG. 4, according to an embodiment of the present invention, is closer view of the blades.
Figure 5:
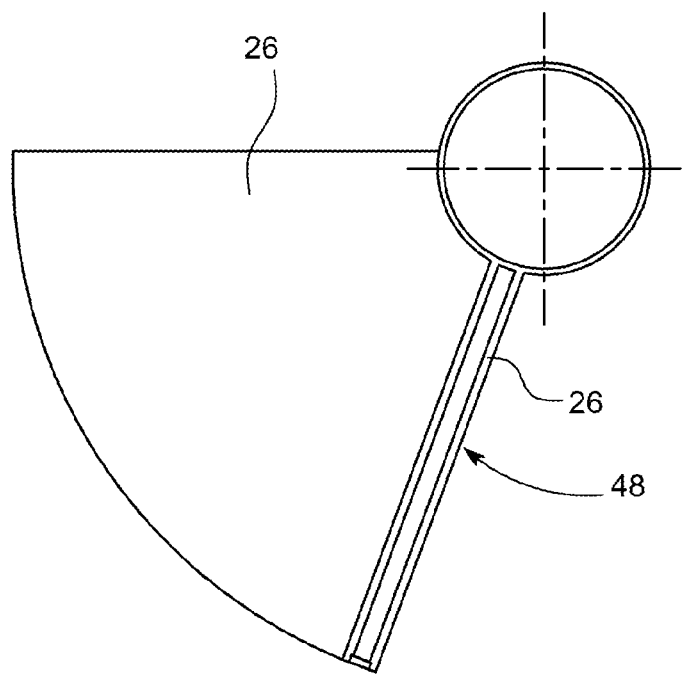
FIG. 5, according to an embodiment of the present invention, is a cross-sectional view of the flighting.

The present invention comprises an improved screw conveyor designed for reduced maintenance. The screw conveyor, as widely known in the art, is employed for the conveyance of material wherein, the material in the context of the present includes (but not limited to) small-sized particles such as, detergents, food, medical raw material, etc. Referring to FIG. 1, the screw conveyor 10 broadly comprises an elongate trough assembly and an elongate screw flighting 12 adapted to be rotably disposed within the trough assembly.

Referring to FIG. 1, the trough assembly comprises a trough and a lid 14. The trough comprises an elongate U-trough 16, which, longitudinally, is defined between closed proximal and distal extremities. Laterally, the U-trough 16 terminates in a pair of opposingly-disposed flanges 18. These flanges are flat, however, in one embodiment, they may be corrugated. Depending on the length, the U-trough 16 is fitted with a plurality of bottom legs 20 for support on a base. The lid 14 comprises an elongate, rectangular flat member, which is secured over the top of the U-trough 16 as the lateral edges of the lid 14 are fastened to the flanges 18 by means of suitable fasteners such as, screws, rivets, etc. Alternatively, instead of the fasteners, the lid 14 may be welded to the flanges 18. A pair of input and output gates (not shown) is formed on the U-trough 16 and on the lid 14 for receiving and discharging material therethrough. In one embodiment, one input and several outputs, and vice versa, may be formed. The lid 14 employs a pair of handles 22. In one embodiment, the present invention employs a tubular trough in lieu of the U-trough 16.

In one aspect, the present disclosure is directed to a screw conveyor comprising an elongate trough assembly comprising material input and output gates formed thereon; and an elongate screw fighting rotably disposed within the trough assembly. The fighting may comprise an elongate hollow shaft comprising a plurality of thorough fluid holes helically disposed thereon, a proximal end of the shaft adapted to receive a fluid therethrough and the received fluid is discharged firstly through the plurality of fluid holes.

The flighting may further comprise a plurality of parallel blades helically wound around the shaft, the blades arranged such that, the fluid holes are disposed between the blades resulting in the fluid being discharged from between the blades. The discharged fluid may form a pressurized fluid shield between the outer edges of the blades and the inner surface of the trough assembly. This fluid shield prevents material from entering the space between the edges of the blades and the inner surface of the trough assembly.

Referring to FIGS. 1 through 7, the screw fighting 12 comprises a hollow elongate shaft 24 and a pair of parallel blades 26 helically wound around the shaft 24. Longitudinally, the shaft 24 is defined between a proximal 28P and a distal extremity 28D wherein, on account of the shaft 24 being hollow, the proximal 28P and distal extremities 28D thereof are open. The proximal extremity 28P of the shaft 24 is fitted with a circular bearing seat 30.

The shaft 24 comprises a plurality of thorough fluid holes 32 disposed thereon in a helical pattern such that, the fluid holes 32 are positioned between the pair of blades 26. In one embodiment, the present invention may employ a plurality of shafts 24 that coupled at the extremities thereof so as to extend the length of the screw conveyor 10. In this embodiment, the proximal and distal extremities 28P and 28D of each shaft 24 comprises a female and male ends with a plurality of thorough pin holes 34 disposed around the circumferences of the female and male ends. In order to couple two shafts 24, the male end of one shaft 24 is slid into the female end of another shaft 24 until the pin holes 34 are aligned. Upon alignment of the pin holes 34, pins 36 are inserted therewithin resulting in air-tightly coupling the shafts 24.

Figure 6B:
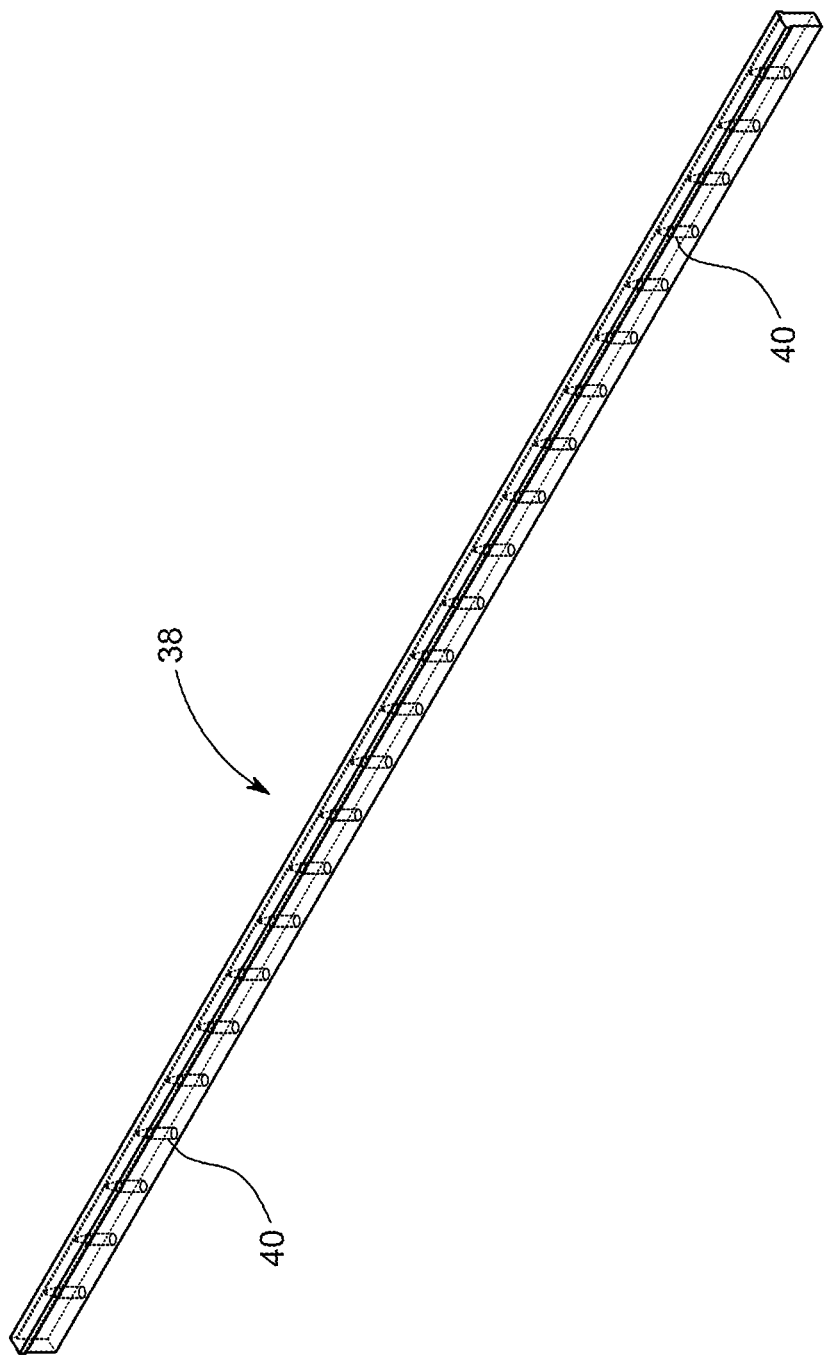
Figure 7:
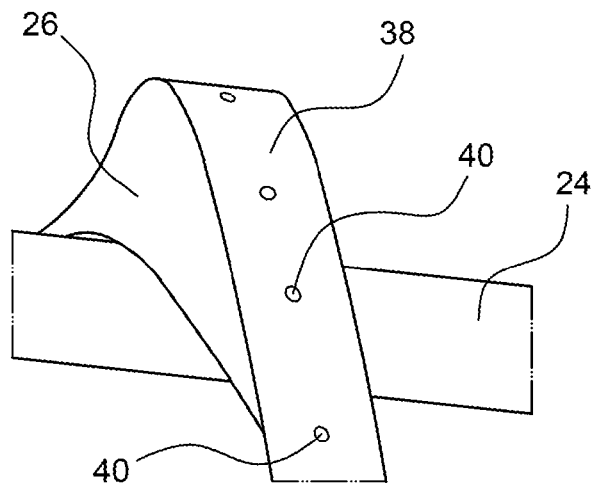
FIG. 7, according to an embodiment of the present invention, is closer view of the blades fitted with a nozzle member.
Figure 8:
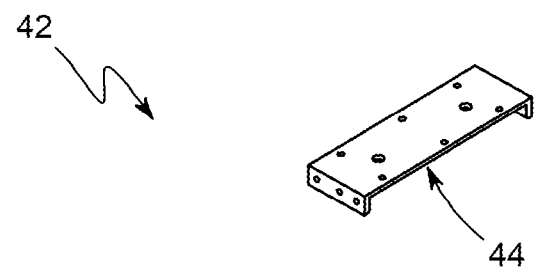
FIG. 8, according to an embodiment of the present invention, is an exploded perspective view of the hanger.
Figure 8:
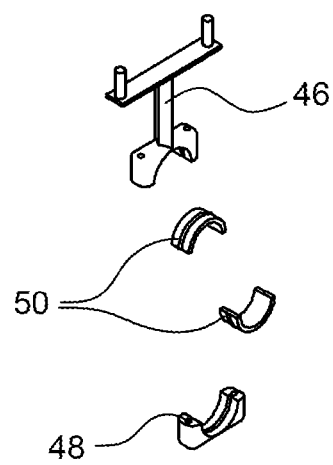

The fighting 12 further comprises an elongate nozzle member 38 shaped helically to be fitted between the outer edges of the pair of blades 26 air-tightly. The nozzle member 38 comprises a plurality of linearly-aligned nozzles 40 disposed thereon, wherein the utility of the nozzles 40 will become apparent from the following body of text. As seen in FIGS. 6A and 6B, two types of nozzle members 38 are employed, one of which being permanent (FIG. 6A), while the other (FIG. 6B) being replaceable.

The trough assembly may comprise an elongate trough; and an elongate lid secured over the trough, with the flighting disposed between the trough and the lid. In another example, the trough comprises a U-trough. The trough may comprise a tubular trough.

The screw conveyor may further comprise a drive rotably coupled to a distal extremity of the shaft, the drive for powering the rotation of the flighting, with the drive supported by the trough assembly. The shaft may comprise a plurality of elongate hollow shafts coupled to one another at the extremities thereof. The screw conveyor may further comprise a fluid regulator for regulating the influx of the fluid through the proximal extremity of the shaft. The fluid may comprise gas or a combination of gases. In one example, the gas comprises air.

Referring to FIGS. 1 through 5, 7 and 8, the flighting 12 is secured within the trough assembly as the proximal and distal extremities 28P and 28D of the shaft 24 are rotably supported by the proximal and distal extremities of the trough assembly respectively. The trough assembly further comprises a hanger 42 disposed at the proximal extremity thereof for supporting the proximal extremity 28P of the shaft 24.

More particularly, the hanger 42 comprises a hanger base 44 secured to the lid 14 by means of suitable fasteners such as, screws, rivets, etc., a hanger arm 46 extending downwardly from the base 44 and a bearing cap 48 disposed at the free end of the hanger arm 46. A bearing 50 sitting within the bearing cap 48 is adapted to receive the bearing seat 30 of the shaft 24 as the fighting 12 is secured within trough assembly. Depending on the length of the shaft 24, one or more hangers 42 are employed within the trough assembly in the same manner as aforementioned in order to support the weight of the fighting 12.

Notably, in the scenario, where multiple hangers 42 are employed, the blades 26 are designed to be discontinuous in order to avoid contact between the hangers 42 and the blades 26. The portion of the distal extremity 28D of the shaft 24 extending beyond the closed distal extremity of the trough assembly is coupled to a drive 52 for rotating the fighting 12 in clock and counter-close wise directions. Notably, the distal extremity 28D of the shaft 24 is rendered closed upon being coupled with the drive 52.

The flighting of the screw conveyor may further comprise an elongate nozzle member helically secured between two parallel blades. The plurality of blades may comprise a pair of blades, where at least a portion of the surfaces of the blades are parallel to one another. The nozzle member may comprise a plurality of nozzles disposed thereon, the nozzles for discharging pressurized fluid therethrough resulting in the formation of the shield. The nozzle member may be disposed between the outer edges of the parallel blades. The nozzle member may be removably secured between the blades.

Referring to FIGS. 1 through 5 and 7, the portion of the proximal extremity 28P of the shaft 24 extending beyond the proximal extremity of the trough assembly is fitted coupled a fluid regulator 54 for pumping fluid into the shaft 28 at regulated pressures. The fluid entering the proximal extremity 28P of the shaft 24 discharges through the fluid holes 32, which, as mentioned earlier, are disposed between the blades 26. The fluid may be for having at least one of heating, cooling, drying, humidifying effects on the material being conveyed from the input to the output gates.

The fluid trapped between the blades 26 is in turn discharged from the nozzles 40 creating a pressurized fluid shield between the outer edges of the blade 26 and the inner surface of the trough assembly whereby, for a screw conveyor 10 in operation, the fluid shield prevents the material from entering and from eventually getting clogged between the blades 26 and the inner surface of the trough assembly thus reducing the maintenance costs. Notably, the fluid may comprises atmospheric air, steam, or any gases. Additionally, the fluid may be used for heating, cooling, drying and/or humidifying the material that is being conveyed.

One part of the present disclosure discloses a screw conveyor comprising an elongate trough assembly comprising material input and output gates formed thereon; and an elongate screw fighting rotably disposed within the trough assembly. The fighting may comprise an elongate hollow shaft comprising a plurality of thorough fluid holes helically disposed thereon. A proximal end of the shaft may be adapted to receive a fluid and the received fluid may be discharged from a plurality of fluid holes. Furthermore, a plurality of parallel blades may be helically wound around the shaft, with the blades arranged such that the fluid holes are disposed between the blades. This results in the fluid being discharged from between the blades.

The flighting may further comprise an elongate nozzle member helically secured between two parallel blades. The nozzle member may comprise a plurality of nozzles disposed thereon, the nozzles being capable of discharging the fluid through them. The pressurized fluid may be discharged from the nozzles, and this forms a pressurized fluid shield between the outer edges of blades and the inner surface of the trough assembly. By so doing, this prevent the material from entering the space between the edges of the blades and the inner surface of the trough assembly.

The trough assembly may comprise an elongate trough; and an elongate lid secured over the trough; and the fighting being disposed between the trough and the lid. The screw conveyor may, in one example, comprise a drive rotably coupled to a distal extremity of the shaft, the drive for powering the rotation of the fighting; the drive supported by the trough assembly. The screw conveyor may further comprise a fluid regulator for regulating the influx of the fluid through the proximal extremity of the shaft. The fluid, in one example, comprises a gas or a combination of gases. The plurality of blades may be a pair of blades, the surfaces of which are parallel to one another.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

Although the embodiments herein are described with various specific embodiments, it will be obvious for a person skilled in the art to practice the invention with modifications. However, all such modifications are deemed to be within the scope of the claims.

What is claimed is:

1. A screw conveyor comprising:
   (a) an elongate trough assembly comprising material input and output gates formed thereon; and
   (b) an elongate screw fighting rotably disposed within the trough assembly, the fighting comprising:
      (i) an elongate hollow shaft comprising a plurality of thorough fluid holes helically disposed thereon, a proximal end of the shaft adapted to receive a fluid therethrough whereby, the received fluid is discharged firstly the plurality of fluid holes; and
      (ii) a plurality of parallel blades helically wound around the shaft, the blades arranged such that, the fluid holes are disposed between the blades resulting in the fluid being discharged from between the blades;
      the discharged fluid forming a pressurized fluid shield between the outer edges of blades and the inner surface of the trough assembly so as to prevent the material from entering the space between the edges of the blades and the inner surface of the trough assembly.

2. The screw conveyor of claim 1, wherein the trough assembly comprises:
   (a) an elongate trough; and
   (b) an elongate lid secured over the trough; the flighting disposed between the trough and the lid.

3. The screw conveyor of claim 2, wherein the trough comprises a U-trough.

4. The screw conveyor of claim 2, wherein the trough comprises a tubular trough.

5. The screw conveyor of claim 1, further comprising a drive rotably coupled to a distal extremity of the shaft, the drive for powering the rotation of the flighting; the drive supported by the trough assembly.

6. The screw conveyor of claim 1, wherein the shaft comprises a plurality of elongate hollow shafts coupled to one another at the extremities thereof.

7. The screw conveyor of claim 1, further comprising a fluid regulator for regulating the influx of the fluid through the proximal extremity of the shaft.

8. The screw conveyor of claim 1, wherein the fluid comprises gas or a combination of gases.

9. The screw conveyor of claim 1, wherein the gas comprises air.

10. The screw conveyor of claim 1, wherein the fluid is for having at least one of heating, cooling, drying, humidifying effects on the material being conveyed from the input to the output gates.

11. The screw conveyor of claim 1, wherein the plurality of blades comprises a pair of blades, the surfaces of which are parallel to one another.

12. The screw conveyor of claim 1, wherein the flighting further comprising an elongate nozzle member helically secured between two parallel blades, the nozzle member comprising a plurality of nozzles disposed thereon, the nozzles for discharging pressurized fluid therethrough resulting in the formation of the shield.

13. The screw conveyor of claim 12, wherein the nozzle member is disposed between the outer edges of the parallel blades.

14. The screw conveyor of claim 12, wherein the nozzle member is removably secured between the blades.

15. A screw conveyor comprising:
   (a) an elongate trough assembly comprising material input and output gates formed thereon; and
   (b) an elongate screw fighting rotably disposed within the trough assembly, the fighting comprising:
      (i) an elongate hollow shaft comprising a plurality of thorough fluid holes helically disposed thereon, a proximal end of the shaft adapted to receive a fluid therethrough whereby, the received fluid is discharged from the plurality of fluid holes;
      (ii) a plurality of parallel blades helically wound around the shaft, the blades arranged such that, the fluid holes are disposed between the blades resulting in the fluid being discharged from between the blades; and
      (iii) an elongate nozzle member helically secured between two parallel blades, the nozzle member comprising a plurality of nozzles disposed thereon, the nozzles for discharging the fluid therethrough;
      wherein, the pressurized fluid is discharged from the nozzles forms a pressurized fluid shield between the outer edges of blades and the inner surface of the trough assembly so as to prevent the material from entering the space between the edges of the blades and the inner surface of the trough assembly.

16. The screw conveyor of claim 15, wherein the trough assembly comprises:
   (i) an elongate trough; and
   (ii) an elongate lid secured over the trough; the flighting disposed between the trough and the lid.

17. The screw conveyor of claim 15, further comprising a drive rotably coupled to a distal extremity of the shaft, the drive for powering the rotation of the fighting; the drive supported by the trough assembly.

18. The screw conveyor of claim 15, further comprising a fluid regulator for regulating the influx of the fluid through the proximal extremity of the shaft.

19. The screw conveyor of claim 15, wherein the fluid comprises a gas or a combination of gases.

20. The screw conveyor of claim 15, wherein the plurality of blades comprises a pair of blades, the surfaces of which are parallel to one another.

* * * * *